(12) United States Patent
Garrison et al.

(10) Patent No.: US 9,946,438 B2
(45) Date of Patent: Apr. 17, 2018

(54) MAXIMUM VALUE DISPLAYED CONTENT FEATURE

(71) Applicant: General Instrument Corporation, Horsham, PA (US)

(72) Inventors: William J. Garrison, Warminster, PA (US); Albert F. Elcock, West Chester, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 886 days.

(21) Appl. No.: 13/949,890

(22) Filed: Jul. 24, 2013

(65) Prior Publication Data

US 2014/0281985 A1      Sep. 18, 2014

Related U.S. Application Data

(60) Provisional application No. 61/786,764, filed on Mar. 15, 2013.

(51) Int. Cl.
| | |
|---|---|
| *G06F 3/0482* | (2013.01) |
| *G06F 3/0481* | (2013.01) |
| *G06F 3/0488* | (2013.01) |
| *H04N 21/422* | (2011.01) |
| *H04N 21/433* | (2011.01) |
| *H04N 21/44* | (2011.01) |
| *H04N 21/472* | (2011.01) |
| *H04N 21/4725* | (2011.01) |

(52) U.S. Cl.
CPC .......... *G06F 3/0482* (2013.01); *G06F 3/0488* (2013.01); *G06F 3/04812* (2013.01); *H04N 21/42209* (2013.01); *H04N 21/4333* (2013.01); *H04N 21/44008* (2013.01); *H04N 21/4725* (2013.01); *H04N 21/47217* (2013.01)

(58) Field of Classification Search
CPC .. G06F 3/04812; G06F 3/0482; G06F 3/0488; H04N 21/422; H04N 21/433; H04N 21/44; H04N 21/472; H04N 21/4725
See application file for complete search history.

(56) References Cited

U.S. PATENT DOCUMENTS

| | | | | |
|---|---|---|---|---|
| 8,006,195 | B1 * | 8/2011 | Woodings | G06F 3/0481 324/76.19 |
| 2003/0140083 | A1 * | 7/2003 | Watkins | H04L 29/06 718/102 |
| 2005/0220439 | A1 * | 10/2005 | Carton | G11B 27/329 386/240 |
| 2006/0041927 | A1 * | 2/2006 | Stark | G06F 17/30861 725/139 |

(Continued)

OTHER PUBLICATIONS

PCT Search Report & Written Opinion, Re: Application # PCT/US2014/022133, dated Jul. 31, 2014.

*Primary Examiner* — Steven Sax
(74) *Attorney, Agent, or Firm* — Thomas A. Ward

(57) ABSTRACT

Techniques for enhancing a user's viewing experience include providing new opportunities for viewing information or manipulating data during the viewing experience. The user may take an action that has an intended purpose of changing a mode of play of content displayed at the client device. An event prompted by the user action, such as a pause or rewind of the displayed content, may be an event that triggers at least one extended option associated with the displayed content.

6 Claims, 1 Drawing Sheet

(56) References Cited

U.S. PATENT DOCUMENTS

| | | | | |
|---|---|---|---|---|
| 2007/0250775 | A1* | 10/2007 | Marsico | G06F 17/30855 715/716 |
| 2008/0253739 | A1* | 10/2008 | Livesey | H04N 7/17318 386/241 |
| 2009/0144772 | A1* | 6/2009 | Fink | G06Q 30/02 725/42 |
| 2011/0072105 | A1* | 3/2011 | Biderman | H04N 7/17318 709/217 |
| 2011/0072452 | A1* | 3/2011 | Shimy | H04N 7/163 725/25 |
| 2012/0167146 | A1* | 6/2012 | Incorvia | H04N 21/23431 725/60 |
| 2012/0197419 | A1* | 8/2012 | Dhruv | H04N 21/6543 700/94 |
| 2012/0210356 | A1* | 8/2012 | Kiok | H04N 21/23109 725/39 |
| 2012/0210362 | A1* | 8/2012 | Lee | H04N 5/445 725/51 |
| 2012/0290950 | A1* | 11/2012 | Rapaport | H04L 51/32 715/753 |
| 2012/0311094 | A1* | 12/2012 | Biderman | H04N 5/783 709/219 |
| 2013/0031593 | A1* | 1/2013 | Booth | H04N 21/4314 725/110 |
| 2013/0174223 | A1* | 7/2013 | Dykeman | G06F 21/10 726/4 |
| 2013/0227038 | A1* | 8/2013 | Rich | H04L 29/06476 709/206 |
| 2014/0089017 | A1* | 3/2014 | Klappert | G06Q 10/02 705/5 |
| 2014/0181667 | A1* | 6/2014 | Chen | H04N 5/783 715/716 |

* cited by examiner

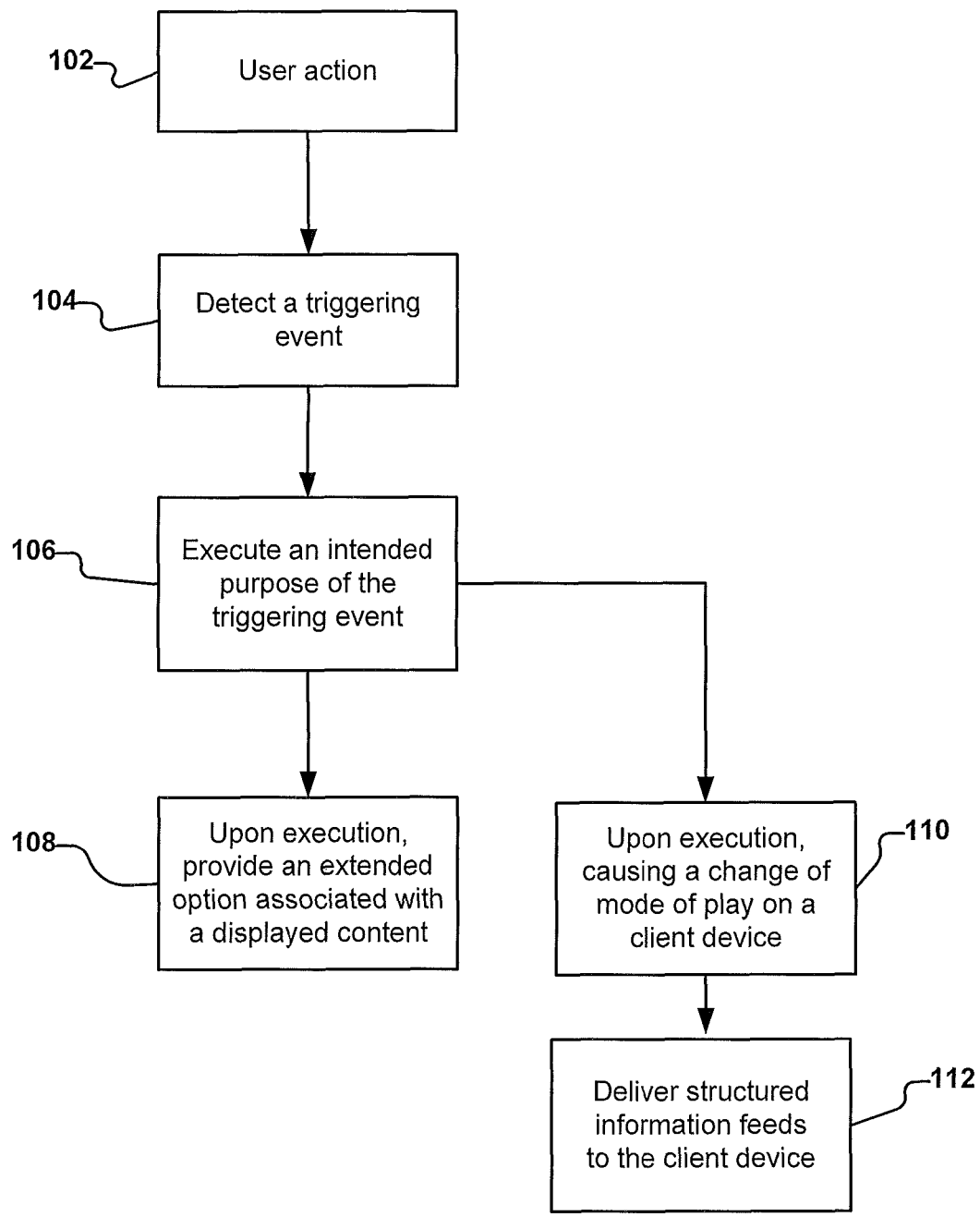

MAXIMUM VALUE DISPLAYED CONTENT FEATURE

CROSS-REFERENCE

The present application claims priority from U.S. Provisional Application No. 61/786,764, filed Mar. 15, 2013, the entire disclosure of which is incorporated herein by reference.

BACKGROUND

It is desirable to improve the viewing experience of a user.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings:

FIG. 1 depicts an example flow diagram for providing an extended option to a user for enhancing a user's viewing experience.

It is noted that while the accompanying Figures serve to illustrate embodiments of concepts that include the claimed invention, and explain various principles and advantages of those embodiments, the concepts displayed are not necessary to understand the embodiments of the present invention, as the details depicted in the Figures would be readily apparent to those of ordinary skill in the art having the benefit of the description herein.

DETAILED DESCRIPTION

Disclosed herein are techniques for enhancing a user's viewing experience by providing new opportunities for viewing information or manipulating data during the viewing experience. In embodiments, a triggering event may provide the user with enhanced options for viewing information or manipulating data.

FIG. 1 depicts an example flow diagram for providing an extended option to a user for enhancing a user's viewing experience. At 102, a user may take an action. In embodiments, the intended purpose of the user action is to change a mode of play of content displayed at the client device. For example, the user may wish to pause or rewind the displayed content. The user action may include pressing a button (e.g., a pause or rewind button) on a device that can send a command to change the mode of play of the displayed content accordingly. An event prompted by the user action, such as a pause or rewind of the displayed content, may be an event that triggers at least one extended option associated with the displayed content to also be provided, thus referred to herein as a triggering event. At 104, the triggering event may be detected such that the execution of the intended purpose of the triggering event, at 106, triggers the extended option associated with the displayed content to also be provided, at 108.

In embodiments, the intended purpose of the event that triggers the extended option is a change in the mode of play of content. For example, the triggering event may include pausing a displayed content, fast-forwarding the content, putting the content in a slow-motion mode, rewinding the content, initiating live play, initiating playback of recorded content, resuming paused content, or the like.

The execution of the intended purpose of the triggering event at 106 (e.g., pausing the displayed content) may cause at least one extended option associated with the displayed content may be provided at 108. Thus, the extended option for viewing information associated with the displayed content is made available upon detection of the triggering event without requiring additional user input. The user action primarily designed to change the mode of display may therefore provide an extended option. Examples of an extended option include the display of a text box, a visual indication of selectable or tagged items in the displayed content, In embodiments, changing a mode of play, such as entering in to a pause mode, may trigger the availability of a variety of options to a user at 108, e.g., media identification, social media coordination, a text search, as described in more detail below. In embodiments, the trigger event detected at 104 may be a user selection of an item from a displayed content, where the user is provided with new opportunities for viewing information or manipulating data based on content selected. The triggering event may occur during content playback or live video and may occur during any viewing mode (e.g., live, rewind, fast-forward, pause). In embodiments, the techniques described are available to the user from a client device, such as a set-top box connected to a display device, a tablet, a personal computer, a mobile device, or the like.

Some users, referred to commonly as lean-back viewers, prefer a laid-back viewing experience that does not require significant interaction on the part of the user to perform desired tasks. It may be desirable in the context of the disclosed techniques to minimize user interaction required to initiate the options available for enhanced viewing. In embodiments, the enhanced options provided at 108 may be made available as an extended result to the result intended by the triggering event. For example, the triggering event may be a change in play mode, where the intended result is a change in mode, e.g., from live play to pause mode, or from live play to fast-forward mode. While the triggering event in this example is a change in mode, having an intended result of modifying the mode of play, the extended result may be to make the enhanced options available to the user. In this manner, the enhanced options may be made available to the user without requiring additional user input.

As a result of a triggering event, the extended options available to a user may be an identity of tagged items in the displayed content. For example, a user may cause a display of content to enter a pause mode, such as by pressing a pause button on a control device or performing a pause gesture on a touch screen device. Recognizing the triggering event, items in the paused scene that are tagged may automatically be identified to the user as an extended result of the entry into pause mode.

Tagged items may include people or objects in the content that are selectable or have metadata available. There are various entities/sources responsible for tagging items in content, such as a content provider, an advertiser, the client device, a user, or the like. Tagging can be performed by an application hosted on a processor in the client device, such as a set-top box, digital video recorder (DVR) tablet, personal computer (PC), or by an application hosted in the network, such as in a processor at the headend, a cloud, a content provider, or any on-demand service. Both people and objects can be tagged, to the level of the application's ability.

In embodiments, an indicator that an item is tagged may be a selectable icon or text balloon that is displayed next to each of the items in the displayed content. The icon or balloon may include information about the item, provide an option to select the icon/balloon for additional information, or provide an option to perform additional tasks associated with the selected item. Items may be selected in any manner suitable to the client device, such as by touching the icon/balloon portion of the screen, hovering a cursor over the icon/balloon, clicking on the icon/balloon with a mouse, or the like. In embodiments, a user selects the item using a computer-aided control device, e.g., a mouse or keyboard. The user may configure the manner in which the client device displays the information, such as next to the object, on another screen, on another device, or the like. Tags and information associated with each of the tagged items may be stored for use during a subsequent playback of the content.

The tagging feature disclosed may combine the benefits of improving facial and object recognition techniques with live play or content playback technology (such as DVR, nDVR, VOD, or the like). In embodiments, a tagging feature combines facial and object recognition techniques with content display technology to identify selected content and provide additional information about the selected content. The extent of the tagging may depend on the sophistication of the hosted application. For example, object and facial recognition software is improving and becoming more reliable. The abilities to identify persons via facial recognition software in a displayed content may depend on the abilities for facial recognition in the hosted application.

The metadata for an item selected may provide additional options to access information. For example, the metadata may include a source of the item or a link to a website for purchasing the product. Thus, the user can access external sources of information related to a displayed item. For example, if a user selects a person on the screen, metadata may be displayed that relates to the image, such as the type of clothing the person is wearing. The metadata may include a brand of the clothing or a link to a store that sells the clothing).

The user can select an item and/or use the available metadata to manipulate the content displayed/played for the user. For example, the user can select any of the tagged items and jump forward or backwards to a different scene in which the tagged item appears. An application could use facial recognition software to find the next occurrence of the tagged item or (if the tagged item is named). Options on the remote control that are common for controlling content, e.g. the play or rewind buttons, may be selectable to cause a jump to a different scene having the selected tagged object. Remote controls used for DVD playback, for example, commonly have chapter search buttons which are normally used for DVD playback. The chapter buttons in the context of the disclosed enhanced options could be used to cause a jump to a different scene having the selected tagged object. When scene jumping, the client device may restart the playback of the content a period before the item appears, e.g., a few seconds before the item appears, to provide context for the new scene.

There are options available for a person tagged in displayed content as well. For example, a user may select an actor displayed on screen and have options to select a different scene or different content with the selected actor. Consider a viewer that really likes the actor Harrison Ford. The user pauses the video, i.e., triggering event, and all the actors on the screen are tagged. The user selects Harrison Ford. Note that the application tagging might not know the actor is Harrison Ford and is just tagging all people in the picture. The viewer then presses the "next chapter" button and the video resumes three seconds before the next scene where an on-screen face which matches Harrison Ford appears. In embodiments, a list of other movies the selected actor has made may be displayed in a list on the display. Databases may augment the described tagging and searching.

In another example, A Formula 1 fan records the F1 race from Italy. Their favorite driver is Michael Schumacher, who drives for Mercedes. The user pauses the video when Michael's car is on screen and his car, the number 7 Mercedes, along with the other cars are tagged. The viewer selects the number 7 Mercedes and then every "chapter search" jumps him to the next video that contains Michael's car.

It should be noted that there are many options for tagging items or including tagged items in content for display. Items may be tagged prior to distribution to the client device or prior to playback of recorded content. For example, an advertiser may identify a product to be tagged in content to be delivered to a client device. The advertiser can designate the metadata available, such as the product source or where to buy the product, if the item is selected. In another example, a content provider may use facial/object recognition software to tag items prior to delivery of the content to the client device. The more items tagged, the more options the user may have to access information associated with the tagged items.

Items may be selectable in real-time for tagging, such as by a user or by the client device at the time of viewing the content. For example, a user may select and tag items as the content is displayed, or the client device may use facial/object recognition software to identify items as the content is displayed. The user may tag an item with a user-defined tag or select a tag from a library of options. The client device may provide a tag as a result of facial/object recognition. The item selected may be tagged and the tag may be stored for future use when the item or a similar item is selected.

Embodiments are disclosed that require minimal viewer involvement to select content, view the information as a result of the selected content, and/or manipulate data based on the selections. For example, in the example of entering a pause mode, items in the paused display may be automatically selected upon entering the pause mode such that no additional interaction is necessary to select the items. Thus, entering the pause mode, e.g., by selecting a pause button a control device or issuing a verbal command, may not only serve to pause the content play, it may identify tagged items in the paused content.

Enhanced options made available to a user upon a triggering event may include aspects of the content other than a display of tagged items. A music identifier option may be available to identify the music playing at the time of the triggering event. For example, if the content displayed is paused, the music playing at the time of the pause may be identified. The identity of the music may be displayed immediately on screen, added to a database of user-selected favorites, or viewable by selecting an icon on the screen.

In embodiments, the enhanced option made available to the user includes accessing external sources for information about the paused video. In the music identifier option, for example, the music may be identified by matching the media to a local library of music. However, in embodiments, the music may be identified by providing a media file, or a clip of the media file, to an external source for music recognition. Similarly, an image clip could be provided to an external source (e.g., Google Images) for matching to and identifying a person or object.

An enhanced option made available to a user upon a triggering event may include access to a text search in text associated with the content. For example, while in pause mode, a text search option may be made available to search for key words in descriptive video and/or closed captioning text. Descriptive video includes text descriptions of the content. Closed captioning represents a text version of the dialogue and sounds that occur in the content. Thus, while the user is in a pause mode, the user may perform a text search in various kinds of text associated with the content. Additional options may be made available to the user based on the results of the text search. For example, the user may select to pause displayed content and, in a text box caused to be displayed upon the triggering event, search the descriptive video for an actor by name, e.g., "Harrison Ford." As a result of the text search, scenes in the content that are tagged with this description may be identified to the user for further action, such as selecting a different scene having an item that matches the searched text.

In embodiments, an enhanced option initiated by the triggering event may be the display of a case list. In another example, a location at the time of the triggering event may be displayed. In another example, background music titles may be displayed. Targeted advertising when the content is paused is also contemplated by the disclosed techniques.

Text associated with the content or associated with specific items in the content is configurable by the user. For example, in embodiments described above, the user may select an item in a scene and provide a user-defined tag that is associated from that point with the item.

In embodiments, the user may insert a marker into the displayed content. The marker may be inserted as a result of a triggering event initiated by the user, where the marker may be inserted in to the content at the time of, or during, the triggering event. For example, when a user pauses a playback session, the content device may insert markers that can be used for subsequent trickplays. A tag configurable by the user may be associated with that marker. For example, when a user could select to pause the content, causing the scene displayed during the pause mode to be marked, and associate a tag (e.g., text that reads "cool car" or "big explosion"). The markers include an indicator of where the content was paused, tags automatically generated at the pause point, and any user-defined tags added at the pause point. Thus, the user may subsequently jump to the marked pause point simply by selecting the marker or selecting the user-defined tag associated with the marker. The user can then jump to the marker easily during a subsequent playback of the content.

A plurality of available enhanced options (e.g., identity of tagged items, media identification, text search, etc) may be compiled into a scrollable list or the like from which the user can select a desired task. For example, if the user causes content to enter in to a pause mode, the various options for additional information or manipulation of data associated with the content or client device may be made available to the user in a list. The display of the list may be initiated by the triggering event. The user can select from the list of enhanced options that is displayed as a result of, or during, the triggering event.

The various options for how and when to view additional information available via the disclosed enhanced viewing options is configurable. The user can configure settings to limit the result of a triggering event to a specific enhanced option. For example, if the user prefers that a pause mode is only used to identify music and only if a user selects an icon for media identification, the user can configure the enhanced options in this manner. In another example, if the user prefers that music identified by a pause is maintained in a database of music associated with the selected icons, the user can define the desired configurations.

Embodiments for enhancing options as a result of a triggering event include combining tagging and social media connections, thereby combining a social medial world with a video play/playback world.

As described above, FIG. 1 depicts an example flow diagram for providing an extended option to a user for enhancing a user's viewing experience. At 102, the user action may take an action. In embodiments, the intended purpose of the user action is to change content displayed at a first client device. For example, a user may submit a revised social media status update at the first client device for the intended purpose of modifying the displayed content.

An event prompted by the user action, such as the update to the social media status update which modifies the content displayed at the first client device, may be an event that triggers, at 110, at least one extended action of changing a mode of play. In embodiments, upon execution of the triggering event at 106, the system will display social media updates at 112. For example, when a user pauses a playback, the system will automatically display Facebook/Google+ status changes that have occurred in the recent past (possibly limited to what occurred since the last pause or program start). In another embodiment, a user selects a pause button at 102, and only a last status update is posted at 112. The settings to configure which social media statuses are of interest are configurable and can be stored for a specific user or device.

From another perspective, the system can be configured by a second user to automatically pause the content during playback at 106 when a social media status of interest changes by a first user at 102. For example, if a designated social media contact, the first user, updates a social media status at 102, the status update executed at 106 by the friend at the first user's client device may trigger a pause of content displayed at the second user's client device at 110. At 112, structured information feeds may be displayed on the second client device.

In another example, the use of key words used in a circle of social media contacts in a status update, executed at 106, can trigger a pause of content displayed at the user's client device at 110. A time frame may be defined to limit the number of status updates displayed (e.g., configured to only show status updates from the last 30 minutes). In another example, the user's own status update can cause content to be paused. The user can define statuses of interest.

It is noted that many examples in this disclosure are described in the context of a pause mode. It is common for users to enter a pause mode, often by selecting a pause button on a control device, e.g., remote control. Other manners of issuing commands are possible, such as voice input commands, gestures, touch-screen inputs, and the like. Both recorded and live content can be paused and there are multiple reasons to pause. Disclosed are options for presenting useful information at the time the video is paused, including providing valuable options that allow the viewer to do more than just resume playback of the content. For example, in embodiments, the user may select content during a paused view, where opportunities for additional information may be made available to a user during the paused view. Thus, the disclosed techniques provide for a maximum value pause where, instead of just providing an option to resume content play, the techniques capitalize on the options available using the still image, enabling selections for enhanced viewing options.

However, it is noted that in addition to a pause mode, the concepts disclosed may extend to other modes, such as a fast-forward mode or slow-motion mode. Further, the concepts can apply to live or real-time play as well as playback of recorded content. Thus, while it may be possible via the disclosed techniques to maximize options available for viewing content during a pause mode, it is also possible to maximize the value possible when selecting content during live play or playback without requiring the content to be paused. For example, during live play, a user may use a control device to point at the display and select an object that is displayed in a single frame of video or displayed throughout the duration of several frames.

We claim:

1. A method for providing an extended option to a user, the method comprising:

detecting a triggering event prompted by user action, wherein an intended purpose of the triggering event is to change a mode of play of content displayed at a client device;

causing, upon execution of the intended purpose of the triggering event, at least one extended option associated with the displayed content to also be provided, wherein said at least one extended option is determined by an application hosted for making the at least one extended option available, and wherein the extended option is determined at a time after the triggering event based on selectable items in the displayed content;

wherein the at least one extended option is actionable by the user to view information associated with the displayed content or modify the content displayed based on an item selected from the displayed content, wherein the triggering event is at least one of a fast-forward, slow-motion or rewind wherein the extended option is a text box with a visual indication making up the selectable items in the displayed content wherein the extended option determination visual indication combines facial recognition techniques with content display technology to identify items in the content, and wherein the client device upon which the intended purpose of the triggering event is executed is a first client device, and the change to the mode of play displayed is executed at the first client device, and the at least one extended option actionable by the user is provided at a second client device.

2. The method of claim 1, wherein, upon a selection of an item from the selectable items, the item is identified via recognition techniques associated with the item.

3. The method of claim 1, wherein upon a selection of an item from the selectable items, at least one other location in the content, if the item appears elsewhere in the content, is identified.

4. The method of claim 3, wherein the content displayed at the client device is moved forward or backward to a different scene in which the item appears.

5. The method of claim 1, wherein the extended option for viewing information associated with the displayed content is made available upon detection of the triggering event without requiring additional user input.

6. The method of claim 1, wherein the user action is an action of a first user, and the user provided the extended option is a second user.

\* \* \* \* \*